United States Patent
Xu

(10) Patent No.: US 12,477,618 B2
(45) Date of Patent: Nov. 18, 2025

(54) SIGNAL RECEPTION METHOD AND TERMINAL DEVICE

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 878 days.

(21) Appl. No.: 17/532,912

(22) Filed: Nov. 22, 2021

(65) Prior Publication Data

US 2022/0086949 A1    Mar. 17, 2022

Related U.S. Application Data

(63) Continuation of application No. PCT/CN2019/109685, filed on Sep. 30, 2019.

(51) Int. Cl.
*H04W 4/00* (2018.01)
*H04W 52/02* (2009.01)
*H04W 76/28* (2018.01)

(52) U.S. Cl.
CPC ....... *H04W 76/28* (2018.02); *H04W 52/0232* (2013.01)

(58) Field of Classification Search
CPC . H04W 76/28; H04W 52/0232; H04W 52/02; H04W 52/0229; H04W 52/0216
See application file for complete search history.

(56) References Cited

U.S. PATENT DOCUMENTS

| | | | | |
|---|---|---|---|---|
| 2011/0002281 | A1* | 1/2011 | Terry | H04W 76/28 370/329 |
| 2011/0292851 | A1* | 12/2011 | Fong | H04W 52/0216 370/311 |
| 2016/0029310 | A1 | 1/2016 | Kim et al. | |
| 2022/0022070 | A1* | 1/2022 | Wu | H04W 24/10 |

FOREIGN PATENT DOCUMENTS

| | | |
|---|---|---|
| CN | 101841823 A | 9/2010 |
| CN | 101932023 A | 12/2010 |
| CN | 102696273 A | 9/2012 |
| CN | 101932023 B | 3/2016 |
| CN | 107155212 A | 9/2017 |
| CN | 109511132 A | 3/2019 |
| WO | WO2010105552 A1 | 9/2010 |

(Continued)

OTHER PUBLICATIONS

Guangdong OPPO Mobile Telecommunications Corp., Ltd., CN202110374224.9, Second Office Action, Nov. 2, 2022, 12 pgs.

(Continued)

*Primary Examiner* — Omoniyi Obayanju
(74) *Attorney, Agent, or Firm* — Morgan, Lewis & Bockius LLP

(57) ABSTRACT

A method for receiving a signal is performed by a terminal device. The method includes: controlling, by the terminal device when entering active time of discontinuous reception DRX, one or more carriers to stop, within at least part of the active time, processing at least part of the signal transmitted by the one or more carriers.

20 Claims, 3 Drawing Sheets

(56) References Cited

FOREIGN PATENT DOCUMENTS

| WO | WO2011069368 A1 | 6/2011 |
| WO | WO2018174635 A1 | 9/2018 |
| WO | WO2020182124 A1 | 9/2020 |
| WO | WO2021062762 A1 | 4/2021 |

OTHER PUBLICATIONS

Guangdong OPPO Mobile Telecommunications Corp., Ltd., EP19947457.8, Second Office Action, May 24, 2023, 6 pgs.
Guangdong OPPO Mobile Telecommunications Corp., Ltd., CN202110374224.9, Notice of Allowance, Jun. 7, 2023, 6 pgs.
Guangdong OPPO Mobile Telecommunications Corp., Ltd., International Search Report and Written Opinion, PCT/CN2019/109685, Jun. 30, 2020, 12 pgs.
Research in Motion UK Limited, DRX Operation for Carrier Aggregation, 3GPP TSG RAN WG2 Meeting #67bis, R2-095835, Miyazaki, Japan, Oct. 12-16, 2009, 4 pgs.
Guangdong OPPO Mobile Telecommunications Corp., Ltd., EP19947457.8, Third Office Action, Oct. 23, 2023, 6 pgs.
Guangdong OPPO Mobile Telecommunications Corp., Ltd., JP2022-515707, First Office Action, Oct. 3, 2023, 11 pgs.
ZTE, "Consideration on UE adaptation to the traffic and UE power consumption characteristics", R1-1810338, 3GPP TSG RAN WG1 Meeting #94bis, Chengdu, China, Oct. 8-12, 2018, 6 pgs.
Guangdong OPPO Mobile Telecommunications Corp., Ltd., Extended European Search Report, EP19947457.8, Jun. 10, 2022, 12 pgs.
Guangdong OPPO Mobile Telecommunications Corp., Ltd., First Office Action, CN202110374224.9, Jul. 4, 2022, 17 pgs.
Guangdong OPPO Mobile Telecommunications Corp., Ltd., Examination Report, IN202127061846, Jun. 10, 2022, 5 pgs.
ZTE, "On adaptation aspects for Nr Ue power consumption reduction," 3GPP TSG RAN WG1 Meeting #95, R1-1812421, Spokane, USA, Nov. 12-16, 2018, 10 pgs.
Guangdong OPPO Mobile Telecommunications Corp., Ltd., EP19947457.8, First Office Action, Feb. 15, 2023, 7 pgs.
Guangdong OPPO Mobile Telecommunications Corp., Ltd., CN202110374224.9, Third Office Action, Mar. 1, 2023, 8 pgs.
Guangdong OPPO Mobile Telecommunications Corp., IN202127061846, Hearing Notice, Jul. 9, 2024, 2 pgs.
Guangdong OPPO Mobile Telecommunications Corp., EP19947457.8, Notice of Allowance, Sep. 6, 2024, 38 pgs.
Guangdong OPPO Mobile Telecommunications Corp., Australian Patent Application No. 2019468569, First Office Action, Mar. 27, 2025, 5 pgs.
Guangdong OPPO Mobile Telecommunications Corp., KR20227008867, Korean First Office Action, 17SEP2025, 12 pgs.

* cited by examiner

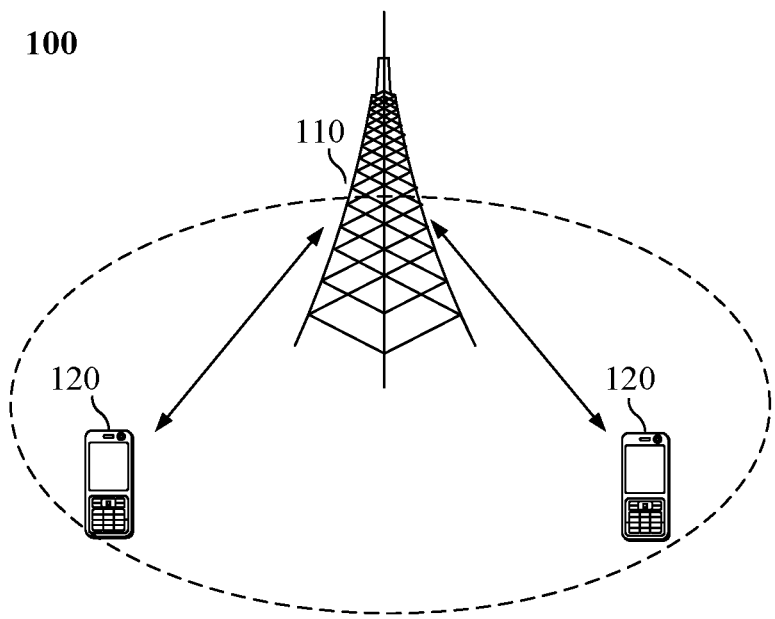
FIG. 1
When a terminal device enters a discontinuous reception (DRX) activation time period, control one or more carriers to use a first processing means to process signals transmitted by the carriers
21
FIG. 2
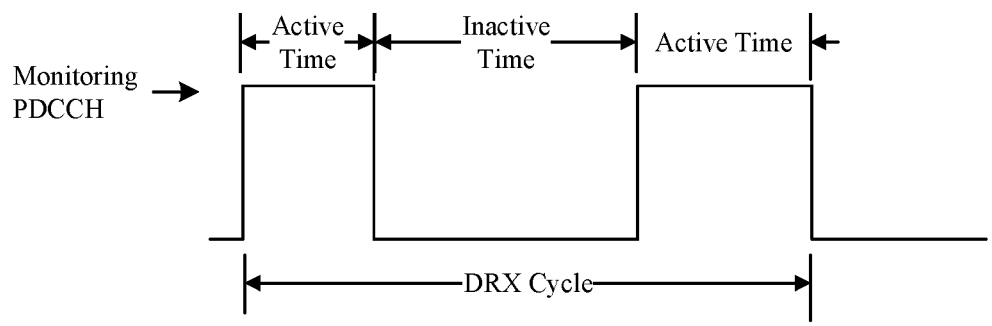
FIG. 3

SIGNAL RECEPTION METHOD AND TERMINAL DEVICE

CROSS-REFERENCE TO RELATED APPLICATION

This application is a continuation application of PCT Application No. PCT/CN2019/109685, entitled "SIGNAL RECEPTION METHOD AND TERMINAL DEVICE" filed Sep. 30, 2019, the entire contents of which are incorporated herein by reference.

TECHNICAL FIELD

The disclosure relates to the field of information processing technology, and in particular to a method for receiving signal, a terminal device, a chip, a computer readable storage medium, a computer program product and a computer program.

BACKGROUND

The energy saving of terminal device has been concerned in related art. In related art, the terminal device can cause carriers to have active time and inactive time by configuring DRX (Discontinuous Reception) ON. In another manner, the terminal device can control all its own carriers for processing by means of cross-slot scheduling, which can also achieve energy saving to a certain degree. However, these manners cannot achieve refined carrier management and cannot achieve better energy saving effects.

SUMMARY

Embodiments of the disclosure provide a method for receiving signal, a terminal device, a chip, a computer readable storage medium, a computer program product and a computer program, so as to solve the above technical problem.

According to a first aspect, provided is a method for receiving signal, including:
  controlling, by a terminal device when entering active time of discontinuous reception DRX, one or more carriers to process the signal transmitted by a carrier through a first processing manner;
  wherein, in the first processing manner, processing is stopped, within at least part of the active time, for at least part of the signal transmitted by the one or more carriers.

According to a second aspect, there is provided a terminal device, including:
  a processing unit, configured to control, when entering active time of discontinuous reception DRX, one or more carriers to process signal transmitted by a carrier through a first processing manner;
  wherein, in the first processing manner, processing is stopped, within at least part of the active time, for at least part of the signal transmitted by the one or more carriers.

According to a third aspect, there is provided a terminal device, including: a processor and a memory. The memory is configured to store a computer program, and the processor is configured to call and run the computer program stored in the memory, thereby implementing the method according to the forgoing first aspect or any embodiment thereof.

According to a fourth aspect, there is provided a chip configured to implement the method according to forgoing embodiments.

Specifically, the chip includes a processor, configured to call and run a computer program from a memory, thereby causing an apparatus provided with the chip to implement the method according to the forgoing first aspect or any embodiment thereof.

According to a fifth aspect, there is provided a computer readable storage medium, being used for storing a computer program, wherein the computer program causes a computer to implement the method according to the forgoing first aspect or any embodiment thereof.

According to a sixth aspect, there is provided a computer program product, including computer program instructions that cause a computer to implement the method according to the forgoing first aspect or any embodiment thereof.

According to a seventh aspect, there is provided a computer program which, when running on a computer, causes the computer to implement the method according to the forgoing first aspect or any embodiment thereof.

Based on the above solution, a processing manner of one or more carriers during the active time of DRX is controlled, for example, reducing the monitoring time of the terminal device and/or reducing the monitoring content of the terminal device, so that the energy saving of the terminal device can be controlled with a finer granularity. Moreover, the physical layer signaling interaction between the network side and the terminal side is not involved in the processing, thereby avoiding the problem of increased physical layer signaling overhead.

BRIEF DESCRIPTION OF THE DRAWINGS

FIG. 1 is a schematic diagram illustrating a communication system architecture according to a first embodiment of the application;

FIG. 2 is a schematic flowchart illustrating a method for receiving signal according to an embodiment of the application;

FIG. 3 is a schematic diagram illustrating DRX according to an embodiment of the application;

DETAILED DESCRIPTION

Figure 4:
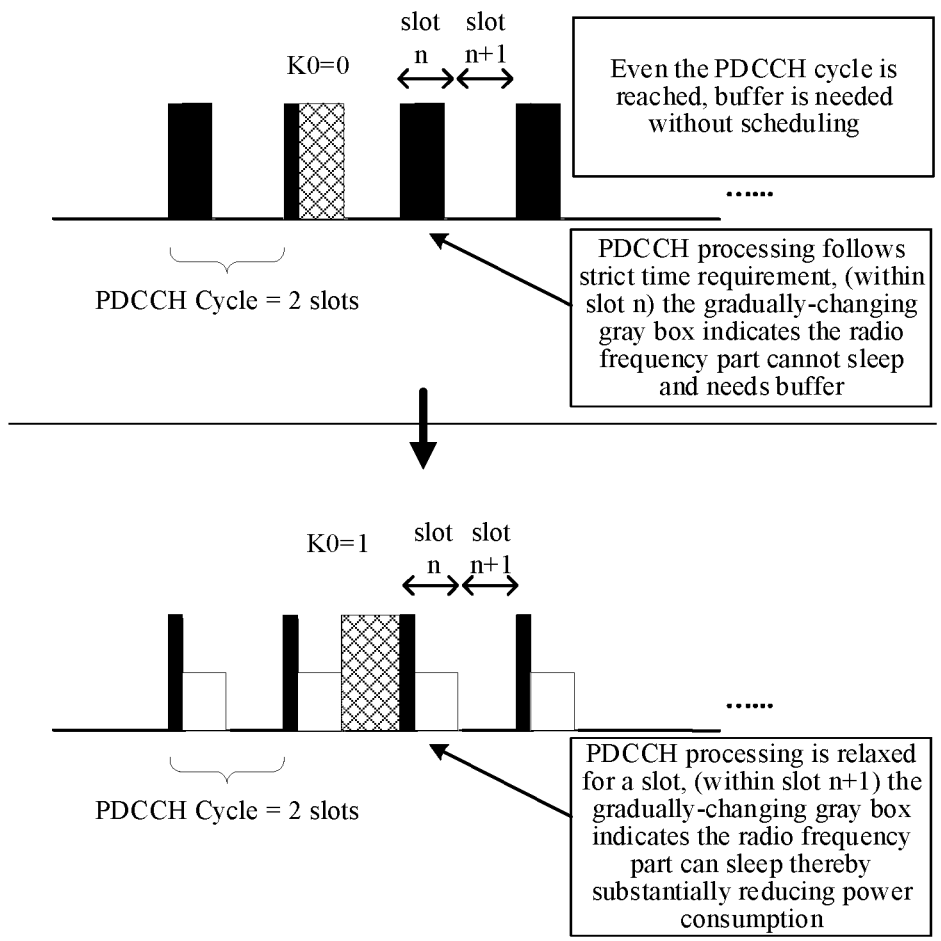
FIG. 4 is a schematic diagram illustrating a cross-slot processing scenario according to an embodiment of the application.

In order to understand the characteristics and technical content of the embodiments of the application in more detail, the embodiments of the application will be described in detail below with reference to the accompanying drawings. The attached drawings are for reference and explanation purposes only, and are not intended to limit the embodiments of the application.

The technical solution according to the embodiments of the application will be described below with reference to the drawings in some embodiments of the application. Obviously, the described embodiments are part of the embodiments of the application, but not all of the embodiments. Based on the embodiments in the application, all other embodiments acquired by a person of ordinary skill in the art without creative efforts shall fall within the protection scope of the application.

Embodiments of the application can be applied to various communication systems, for example, Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, 5G system and the like.

For example, a communication system 100 in which the embodiments of the application are applicable is shown in FIG. 1. The communication system 100 may include a network device 120, which may be a device that communicates with UE 120 (also referred to as communication terminal or terminal). The network device 110 can provide communication coverage for a specific geographic area, and can communicate with UE located within the coverage area. Optionally, the network device 110 may be a base transceiver station (BTS) in the GSM system or CDMA system, or a NodeB (NB) in the WCDMA system, or an evolutional Node B (eNB or eNodeB) in the LTE system, or a radio controller in Cloud Radio Access Network (CRAN). Also, the network device may be a mobile switching center, relay station, access point, in-vehicle device, wearable device, hub, switch, bridge, router, or network device in 5G network or in future-evolved public land mobile network (PLMN).

The communication system 100 may further include UE 120 located within a coverage area of the network device 110. The UE may be any terminal device, including but not limited to, connection via wired lines, such as public switched telephone networks (PSTN), digital subscriber lines (DSL), digital cables, direct cable connections; and/or another data connection/network; and/or connection via a wireless interface, such as cellular networks, wireless local area networks (WLAN), digital television networks such as DVB-H networks, satellite networks, AM-FM broadcast transmitter; and/or another terminal device configured to receive/transmit communication signals; and/or an Internet of Things (IoT) device. The UE configured to communicate through the wireless interface may be referred to as a "wireless communication terminal", a "wireless terminal", or a "mobile terminal".

Optionally, D2D (Device to Device) communication can be performed between UEs 120.

It should be understood that the terms "system" and "network" are often used interchangeably herein. The term "and/or" in this document is only a kind of association relationship describing related objects, which means that there can be three kinds of relationships, for example, A and/or B may refer to three cases: A exists alone, A and B exist simultaneously, or B exists alone. In addition, the character "/" in this article generally indicates that the related objects are in an "or" relationship.

In order to understand the characteristics and technical content of the embodiments of the application in more detail, the embodiments of the application will be described in detail below with reference to the accompanying drawings.

The attached drawings are for reference and explanation purposes only, and are not intended to limit the embodiments of the application.

Embodiments of the disclosure provide a method for receiving signal. As shown in FIG. 2, the method includes following steps.

In step 21, a terminal device, when entering active time of DRX (Discontinuous Reception), controls one or more carriers to process the signal transmitted by a carrier through a first processing manner;

wherein, in the first processing manner, processing is stopped, within at least part of the active time, for at least part of the signal transmitted by the one or more carriers.

In some embodiments, the DRX transmission mechanism implements discontinuous reception of signals in the time domain through semi-static configuration. When there is no data transmission, power consumption can be saved by stopping receiving PDCCH (the blind PDCCH detection will stop at this time). The DRX configuration manner is achieved by configuring the terminal device in RRC_CONNECTED state with a DRX cycle. As shown in FIG. 3, the DRX cycle consists of "Active Time" and "Inactive Time". During the "Active Time", the terminal device monitors and receives the PDCCH (active period); while during the "Inactive Time", the terminal device does not receive PDCCH to reduce power consumption (dormancy period). The "Active Time" and "Inactive Time" are formed into continuous DRX cycles. Each DRX cycle starts with entering DRX ON state. In the DRX ON state, the UE will detect PDCCH according to configured MO (Monitoring Occasion). When the UE detects the PDCCH, it also starts and refreshes an Inactivity Timer. If the DRX ON is not over or the Inactivity Timer is not over, the UE will be in Active Time. The UE in Active Time needs to detect the PDCCH.

The solution provided in some embodiments will be described in detail below with reference to various examples:

Example 1

In this example, the carrier is a secondary carrier configured and activated by the terminal device, and may be one or more secondary carriers configured and activated by the terminal device.

In other words, when the terminal device enters the active time, it enters the first processing manner on one or more activated secondary carriers configured by the terminal device; the first processing manner may also be referred to as a dormancy mode.

It should be pointed out that, in this example, the first processing manner is only configured for the activated secondary carrier. The second processing manner is adopted by default for the primary carrier, or it can be understood that a general processing manner in related art is adopted for the primary carrier to perform DRX processing. Herein, the second processing manner is different from the first processing manner, and in the second processing manner, the processing is maintained for the signal transmitted by the carrier during the active time, and the maintained processing includes monitoring a configured control channel search space of the carrier. In some embodiments, the signal transmitted by the carrier may also be referred to as the signal transmitted on the carrier, such as CSI measurement, CSI reporting, and so on.

Specifically, the first processing manner may include at least one of the following:

within the active time, stopping monitoring at least part of physical downlink control channel PDCCH search space;

within the active time, monitoring at least part of the PDCCH search space by using an adjusted monitoring period, wherein a length of the adjusted monitoring period is greater than an original monitoring period.

During the active time, stopping monitoring at least part of the PDCCH search space refers to stopping monitoring part or all of the PDCCH search space on said one or more activated secondary carriers.

During the active time, monitoring at least part of the PDCCH search space with the adjusted monitoring period means that an extended monitoring period of PDCCH search space is used on the one or more activated secondary carriers.

It should be understood that the foregoing two first processing manners can be used alone or in combination. For example, during each active time, monitoring at least part of the PDCCH search space is stopped on the secondary carriers within the active time.

Alternatively, for the secondary carriers, at least part of the PDCCH search space is monitored using the adjusted monitoring period during the active time.

Alternatively, for a part of the secondary carriers as designated, monitoring at least part of the PDCCH search space is stopped during the active time; for the remaining part of the secondary carriers, at least part of the PDCCH search space is monitored using the adjusted monitoring period during the active time.

It should also be understood that, in this example, the activated secondary carrier can be activated according to an indication of the network device, or a configuration of the network device, or negotiation between the terminal device and the network device. In addition, the secondary carrier on which the first processing manner is adopted may include a part or all of the activated secondary carriers, all of which fall within the protection scope of this example and will not be exhaustively listed.

Furthermore, the manner for determining the aforementioned adjusted monitoring period may include:

obtaining the adjusted monitoring period by adjusting the original monitoring period based on an adjustment factor;

or, determining a pre-configured monitoring period as the adjusted monitoring period.

The adjustment factor may be an integer greater than 1, which means that the adjusted monitoring period must be greater than the original monitoring period. For example, it can be set to 10, then the adjusted monitoring period=10*original monitoring period.

The pre-configured monitoring period is greater than the original monitoring period. The pre-configuration monitoring period can be pre-configured by the network device for the terminal device through signaling.

In this example, the terminal device may maintain processing of the activated secondary carrier, or that of the activated secondary carrier that enters the first processing manner, or that of other parts of the signal transmitted by the carrier, for example, CSI measurement, CSI reporting, uplink and downlink synchronization, or the like.

Specifically, the other part of the signal transmitted by the carrier, of which the processing is maintained, can be pre-configured according to actual situation. For example, the network device can configure the terminal device with a list of signals transmitted by the carrier, of which the processing must be maintained. Then the terminal device can maintain processing of the signal transmitted by the carrier in the list. Alternatively, it may include a signal transmitted by some default carriers.

The method also includes:

determining, by the terminal device, whether to enter the active time of DRX according to an indication of energy saving signal and/or through a DRX timer.

The indication of energy saving signal can be sent by the network device. For example, the terminal device can report its own capability to the network device in advance, and the capability can include whether it supports the first processing manner (or whether it supports the energy saving processing capability). If it is supported, the network device can send the indication of energy saving signal to the terminal device according to the current situation, for example, the network device may determine whether energy saving is currently needed. Alternatively, the terminal device may send an energy saving request to the network device, and then if the network device agrees, the network device can send the indication of energy saving signal.

The duration of the DRX timer can be pre-configured for the terminal device.

In another manner, the method further includes:

acquiring configuration information sent by the network device, wherein the configuration information is used for indicating whether to enable the terminal device to adopt the first processing manner.

In other words, whether the pre-configured terminal device can enter the first processing manner to process the signal transmitted by the carrier can be enabled by the network device for the terminal device.

If the configuration information indicates that the terminal device is not enabled to adopt the first processing manner, when the terminal device is in the DRX active time, the second processing manner is adopted on one or more secondary carriers for processing the signal transmitted by the carrier.

Herein, the second processing manner is different from the first processing manner, and in the second processing manner, the processing is maintained for the signal transmitted by the carrier during the active time, and the maintained processing includes monitoring a configured control channel search space of the carrier.

For example, if the network device configuration does not enable the terminal device to adopt the first processing manner, the processing manner when the terminal device enters the active time is the second processing manner, that is, the non-dormant manner, or can be understood as the general manner in related art for processing. Conversely, if the network device configuration enables the terminal device to adopt the first processing manner, the processing manner when the terminal device enters the active time is the first processing manner.

In this way, it is possible to control whether the first processing manner is entered for the activated one or more secondary carriers.

In addition, based on the foregoing processing manner, the configuration information may be used for:

indicating whether to enable the terminal device to adopt the first processing manner for one or more carriers; or indicating whether to enable the terminal device to adopt the first processing manner for one or more carrier groups, wherein, the carrier group includes one or more carriers.

In other words, configuration information may be used for configuring whether to enable the first processing mode for each secondary carrier; or, it may be configured, based on a carrier group, whether to enable the first processing manner for the secondary carriers in the carrier group.

In another processing manner, entering and exiting the dormant mode by UE can be indicated by a specific bit field in the scheduling PDCCH. In this manner, entering or exiting the first processing manner is controlled in real time for the carrier (that is, the aforementioned secondary carrier) based on the PDCCH.

Specifically, during the active time of DRX that the terminal device enters, when the first processing manner is adopted for a first carrier to process signal transmitted by the first carrier, first indication information sent via a downlink control channel is received through a second carrier, wherein the first indication information is used for indicating exiting the first processing manner for the first carrier.

Based on the first indication information, it is controlled to exit the first processing manner for the first carrier, and the signal transmitted by the first carrier is processed through the second processing manner on the first carrier.

In addition, during the active time of DRX that the terminal device enters, when a second processing manner is adopted for the first carrier to process signal transmitted by the first carrier, second indication information sent via the downlink control channel is received through the first carrier, wherein the second indication information is used for indicating entering the first processing manner for the first carrier.

In other words, when an activated secondary carrier enters the DRX active time, if the signal transmitted by the carrier is processed through the first processing manner, the downlink control channel, that is, the PDCCH, will not be monitored. Therefore, the downlink control channel (that is, PDCCH) can be received on another second carrier that is not in the first processing manner (for example, the second carrier may be a primary carrier, or may be another activated secondary carrier in the second processing manner). Based on the first indication information monitored by the second carrier, it can be determined to switch the first carrier from the first processing manner to the second processing manner.

In some embodiments, the specific field of the scheduling PDCCH may be used for indicating a specific carrier to select a dormant mode or a non-dormant mode for processing. In other words, the first indication information may include an indication for controlling change of the processing manner, and an identification of the first carrier (or an index, or a serial number and other information for identifying the first carrier).

When the first carrier is in the second processing manner, the downlink control channel (that is, PDCCH) can be monitored. Therefore, if the downlink control channel is monitored to indicate switching its own processing manner, the first carrier can be controlled, according to the second indication information, to switch from the second processing manner to the first processing manner.

It can be seen that by adopting the above solution, it is possible to control the carrier to enter the first processing manner when the terminal device enters the DRX active time, thereby reducing the monitoring content or the monitoring time, ensuring that the terminal device is more energy saving.

Example 2

On the basis of Example 1, the difference from Example 1 is that several first processing manners are added, which may include:

within the active time, setting a blind PDCCH detection number as an adjusted first value, wherein the adjusted first value is smaller than an original first value of the blind PDCCH detection number; or within the active time, setting a channel estimation resource number as an adjusted second value, wherein the adjusted second value is smaller than an original second value of the channel estimation resource number.

The manner of adjusting the number of blind PDCCH detections may include adjustment according to a preset first adjustment factor or a preset first value. For example, the first adjustment factor is an integer greater than 1, so a value obtained by multiplying the first adjustment factor and the original first value is the adjusted first value. Alternatively, the preset first value is directly used as the adjusted first value.

Similarly, the manner of adjusting the channel estimation resource number may include adjustment according to a preset second adjustment factor or a preset second value. For example, the second adjustment factor is an integer greater than 1, so a value obtained by multiplying the second adjustment factor and the original second value is the adjusted second value. Alternatively, the preset second value is directly used as the adjusted second value.

The several first processing manners provided in this example can also be used in combination with Example 1. For example, the number of blind PDCCH detections can be further adjusted during the extended monitoring period, thereby further reducing the power consumption of the terminal device. For another example, the number of blind PDCCH detections and the channel estimation resource number can be adjusted within the extended monitoring period, and so on, which are not exhausted in this example.

The other processing of this example is the same as that of the foregoing Example 1, and will not be repeated here.

Example 3

This example is different from Examples 1 and 2 in that this example can be applied to the primary carrier and/or the secondary carrier.

In this example, the first processing manner is:

during the active time, activated secondary carrier and/or primary carrier enters a cross-slot scheduling state.

Herein, the cross-slot scheduling state represents that, in the time slot of the channel scheduled by the downlink control channel, or the time slot and its following N time slots, part of hardware in the terminal device is controlled to be in a low power consumption state.

Herein, N is an integer greater than or equal to 1.

The part of hardware may at least include a radio frequency part. Also, there may be other parts of hardware that can be in a low power consumption state, which will not be exhaustive here. In addition, the low power consumption state can be understood as stopping sending, and/or stopping receiving, and/or stopping processing. As long as the power consumption of the terminal device can be reduced, it is within the protection scope of the embodiments.

The description of the cross-slot state is as follows. In the 5G evolution project, a DRX enhancement mechanism is currently supported. A new energy saving mechanism therein is cross-slot scheduling, a basic principle of which is shown in FIG. 4.

The PDCCH of the control channel is configured to be detected periodically. However, a relatively common situation is shown above the dividing line in FIG. 4, where no data scheduling is detected in most PDCCH detection opportunities, but the UE must buffer data after the PDCCH. In this way, the PDCCH processing is in accordance with strict time requirements within the time slot n (that is, the gradually-changing gray part in the drawing), which indicates that the radio frequency part cannot sleep and needs to perform saving.

When the cross-slot scheduling is implemented, the terminal device eliminates the buffer operation after the PDCCH, so the radio frequency module can be shut off immediately after the PDCCH. Below the dividing line in FIG. 4, the cross-slot scheduling state is shown. It can be seen that the PDCCH processing time is relaxed for one slot. The gradually-changing gray box of slot n+1 indicates the radio frequency part can sleep in this time slot, so power consumption can be significantly reduced. As shown in the drawing, K0 (may be referred to as the first value) represents the offset value of the slot where the PDCCH is located and the slot where the scheduled PDSCH is located.

This example provides, based on the foregoing cross-slot scheduling state, the cross-slot scheduling state on the configured active carrier (DRX-On) when entering Active Time.

The configuration of the cross-slot scheduling state includes:
  a first value and a second value;
  wherein, the first value is a minimum value of a time slot offset of a downlink shared channel scheduled by a downlink control channel, the second value is a minimum value of a time slot offset of an uplink shared channel scheduled by the downlink control channel, and
  a ratio of the first value to the second value is greater than a pre-configured minimum value.

In other words, the behavior of the UE in the cross-slot scheduling state is that, the UE assumes that the k0/k2 value of the received data scheduling is greater than the pre-configured minimum value.

The first value k0 corresponds to the minimum value of the slot offset from the PDCCH to the scheduled PDSCH.

The second value k2 corresponds to the minimum value of the slot offset from the PDCCH to the scheduled PUSCH.

The method also includes:
  determining, by the terminal device, whether to enter the active time of DRX according to an indication of energy saving signal and/or through a DRX timer.

The indication of energy saving signal can be sent by the network device. For example, the terminal device can report its own capability to the network device in advance, and the capability can include whether it supports the first processing manner (or whether it supports the energy saving processing capability). If it is supported, the network device can send the indication of energy saving signal to the terminal device according to the current situation, for example, the network device may determine whether energy saving is currently needed. Alternatively, the terminal device may send an energy saving request to the network device, and then if the network device agrees, the network device can send the indication of energy saving signal.

The duration of the DRX timer can be pre-configured for the terminal device.

The pre-configured minimum value is a default minimum time slot offset configured by the network device.

Herein, the default minimum time slot offset is:
  a configuration value of a designated serial number configured by the network device; or
  indicated through the downlink control channel.

For example, a default minimum slot offset value is a configuration value with a fixed serial number configured by the network device, such as the first configuration value. Alternatively, the default minimum slot offset value is 0.

Alternatively, the default minimum slot offset value may be indicated by a specific bit field in the scheduling PDCCH.

Alternatively, an update thereof can be indicated through a specific bit field in the PDCCH.

Generally speaking, in related art, the energy saving of all carriers configured by the terminal device is uniformly processed, and the granularity of such energy saving processing manner is relatively rough. Therefore, in the solution provided according to some embodiments, the processing manner of one or more carriers entering DRX active time can be controlled, for example, including processing such as reducing the monitoring time of the terminal device and/or reducing the monitoring content of the terminal device. In this way, the energy saving of the terminal device can be controlled with a finer granularity. Moreover, the physical layer signaling interaction between the network side and the terminal side is not involved in the processing, thereby avoiding the problem of increased physical layer signaling overhead.

In addition, based on the solution according to some embodiments, the terminal device can also be triggered to enter the second processing manner, that is, the non-energy-saving state, through dynamic signaling when some carriers are configured with the first processing manner, thereby avoiding delay in response time under the energy saving state.

Figure 5:
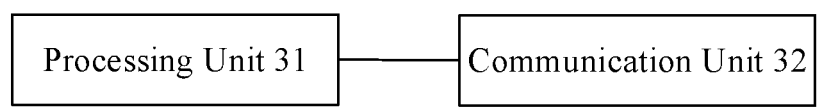
FIG. 5 is a block diagram illustrating a terminal device according to an embodiment of the application.

Embodiments of the disclosure provides a terminal device, as shown in FIG. 5, including:
  a processing unit 31, configured to control, when entering active time of discontinuous reception DRX, one or more carriers to process signal transmitted by a carrier through a first processing manner;
  wherein, in the first processing manner, processing is stopped, within at least part of the active time, for at least part of the signal transmitted by the one or more carriers.

The solution provided in the embodiments will be described in detail below with reference to various examples.

Example 1

In this example, the carrier includes one or more secondary carriers configured and activated by the terminal device. It should be understood that it can be one or more of all the secondary carriers that are configured and activated. For example, there may be 10 secondary carriers that are configured and activated for the terminal device, and this example can be implemented for 8 secondary carriers, or for all of them.

In other words, the processing unit 31 configures the first processing manner on the configured one or more active secondary carriers when entering the active time, wherein the first processing manner may also be referred to as the dormant mode.

Specifically, the first processing manner may include at least one of the following:
  within the active time, stopping monitoring at least part of physical downlink control channel PDCCH search space;
  within the active time, monitoring at least part of the PDCCH search space by using an adjusted monitoring period, wherein a length of the adjusted monitoring period is greater than an original monitoring period.

During the active time, stopping monitoring at least part of the PDCCH search space refers to stopping monitoring part or all of the PDCCH search space on said one or more activated secondary carriers.

During the active time, monitoring at least part of the PDCCH search space with the adjusted monitoring period means that an extended monitoring period of PDCCH search space is used on the one or more activated secondary carriers.

Furthermore, the manner for determining the aforementioned adjusted monitoring period may include:
the processing unit 31 is further configured to obtain the adjusted monitoring period by adjusting the original monitoring period based on an adjustment factor; or,
determine a pre-configured monitoring period as the adjusted monitoring period The processing unit 31 is further configured to determine whether to enter the active time of DRX according to an indication of energy saving signal and/or through a DRX timer In another implementation manner, the terminal device further includes:
a communication unit 32, configured to acquire configuration information sent by the network device, wherein the configuration information is used for indicating whether to enable the terminal device to adopt the first processing manner.

The processing unit 31 is further configured to, when the configuration information indicates that the terminal device is not enabled to adopt the first processing manner, process, during the active time of DRX, the signal transmitted by the carrier through a second processing manner;
wherein, the second processing manner is different from the first processing manner, and in the second processing manner, the processing is maintained for the signal transmitted by the carrier during the active time, and the maintained processing includes monitoring a configured control channel search space of the carrier.

In addition, based on forgoing implementation manner, the configuration information is used for:
indicating whether to enable the terminal device to adopt the first processing manner for one or more carriers; or
indicating whether to enable the terminal device to adopt the first processing manner for one or more carrier groups, wherein, the carrier group includes one or more carriers.

In another implementation manner, entering and exiting the dormant mode by UE can be indicated by a specific bit field in the scheduling PDCCH. In this manner, entering or exiting the first processing manner is controlled in real time for the carrier (that is, the aforementioned secondary carrier) based on the PDCCH.

Specifically, during the active time of DRX that the terminal device enters, when the first processing manner is adopted for a first carrier to process signal transmitted by the first carrier, first indication information sent via a downlink control channel is received by the communication unit 32 through a second carrier, wherein the first indication information is used for indicating exiting the first processing manner for the first carrier.

Based on the first indication information, the processing unit 31 is configured to control exiting of the first processing manner for the first carrier, and the signal transmitted by the first carrier is processed through the second processing manner on the first carrier.

In addition, during the active time of DRX that the terminal device enters, when a second processing manner is adopted for the first carrier to process signal transmitted by the first carrier, second indication information sent via the downlink control channel is received by the communication unit 32 through the first carrier, wherein the second indication information is used for indicating entering the first processing manner for the first carrier.

Example 2

On the basis of Example 1, the difference from Example 1 is that several first processing manners are added, which may include:
within the active time, setting a blind PDCCH detection number as an adjusted first value, wherein the adjusted first value is smaller than an original first value of the blind PDCCH detection number; or
within the active time, setting a channel estimation resource number as an adjusted second value, wherein the adjusted second value is smaller than an original second value of the channel estimation resource number.

Example 3

This example is different from Examples 1 and 2 in that this example can be applied to the primary carrier and/or the secondary carrier.

In this example, the first processing manner is:
during the active time, activated secondary carrier and/or primary carrier enters a cross-slot scheduling state.

The configuration of the cross-slot scheduling state includes:
a first value and a second value;
wherein, the first value is a minimum value of a time slot offset of a downlink shared channel scheduled by a downlink control channel, the second value is a minimum value of a time slot offset of an uplink shared channel scheduled by the downlink control channel, and
a ratio of the first value to the second value is greater than a pre-configured minimum value.

In other words, the behavior of the UE in the cross-slot scheduling state is that, the UE assumes that the k0/k2 value of the received data scheduling is greater than the pre-configured minimum value.

The first value k0 corresponds to the minimum value of the slot offset from the PDCCH to the scheduled PDSCH.

The second value k2 corresponds to the minimum value of the slot offset from the PDCCH to the scheduled PUSCH.

Generally speaking, in related art, the energy saving of all carriers configured by the terminal device is uniformly processed, and the granularity of such energy saving processing manner is relatively rough. Therefore, in the solution provided according to some embodiments, the processing manner of one or more carriers entering DRX active time can be controlled, for example, including processing such as reducing the monitoring time of the terminal device and/or reducing the monitoring content of the terminal device. In this way, the energy saving of the terminal device can be controlled with a finer granularity. Moreover, the physical layer signaling interaction between the network side and the terminal side is not involved in the processing, thereby avoiding the problem of increased physical layer signaling overhead.

In addition, based on the solution according to some embodiments, the terminal device can also be triggered to enter the second processing manner, that is, the non-energy-saving state, through dynamic signaling when some carriers are configured with the first processing manner, thereby avoiding delay in response time under the energy saving state.

Figure 6:
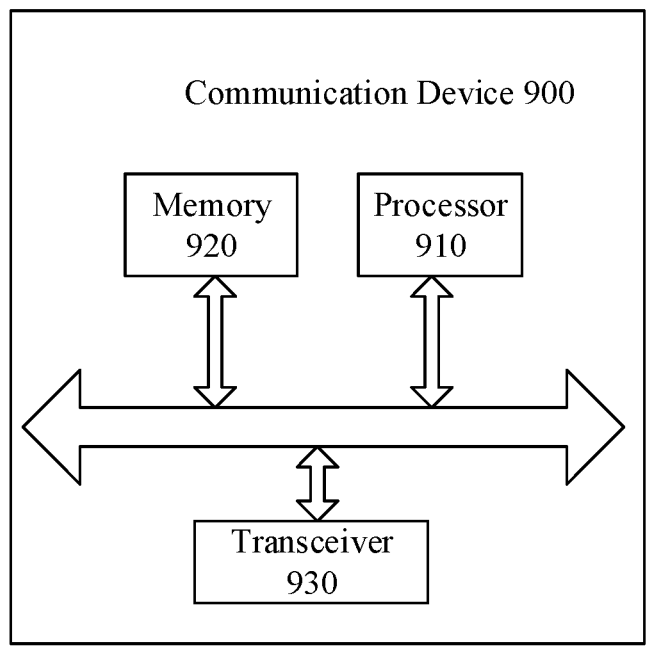
FIG. 6 is a block diagram illustrating a communication device according to an embodiment of the application.

FIG. 6 is a block diagram illustrating a communication device 900 according to an embodiment of the application, which may be, for example, the terminal device described in the forgoing embodiments. The communication device 900 shown in FIG. 6 includes a processor 910, which can call and run a computer program from a memory to implement the method according to the embodiments of the application.

Optionally, as shown in FIG. 6, the communication device 900 may further include a memory 920. The processor 910 may call and run the computer program from the memory 920 to implement the method according to the embodiments of the application.

The memory 920 may be a separate device independent of the processor 910, or may be integrated in the processor 910.

Optionally, as shown in FIG. 6, the communication device 900 may further include a transceiver 930, and the processor 910 may control the transceiver 930 to communicate with other devices. Specifically, it may send information or data to other devices, or receive other information, data sent by the device.

The transceiver 930 may include a transmitter and a receiver. The transceiver 930 may further include antennas, and the number of antennas may be one or more.

Optionally, the communication device 900 may be the network device according to an embodiment of the application, and the communication device 900 may implement a corresponding process implemented by the network device in each method according to the embodiments of the application.

Optionally, the communication device 900 may specifically be a satellite or a network device according to the embodiments of the disclosure, and the communication device 900 may implement the corresponding procedures implemented by the mobile terminal/satellite in each method according to the embodiments of the disclosure, which will be not repeated here for brevity.

Figure 7:
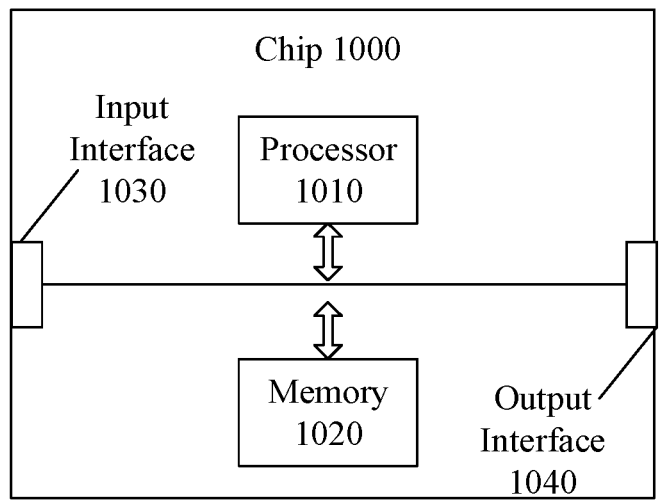
FIG. 7 is a block diagram illustrating a chip according to an embodiment of the application.

FIG. 7 is a block diagram illustrating a chip according to an embodiment of the application. The chip 1000 shown in FIG. 7 includes a processor 1010, and the processor 1010 can call and run a computer program from a memory to implement the method according to the embodiments of the application.

Optionally, as shown in FIG. 7, the chip 1000 may further include a memory 1020. The processor 1010 may call and run the computer program from the memory 1020 to implement the method according to the embodiments of the application.

The memory 1020 may be a separate device independent of the processor 1010, or may be integrated in the processor 1010.

Optionally, the chip 1000 may further include an input interface 1030. The processor 1010 may control the input interface 1030 to communicate with other devices or chips. Specifically, the processor 1010 may acquire information or data sent by other devices or chips.

Optionally, the chip 1000 may further include an output interface 1040. The processor 1010 may control the output interface 1040 to communicate with other devices or chips. Specifically, the processor 1010 may output information or data to the other devices or chips.

Optionally, the chip can be applied to the network device according to the embodiments of the application, and the chip can implement the corresponding process implemented by the satellite in the method according to the embodiments of the application. For brevity, details are not described herein.

It should be understood that the chip mentioned in some embodiments of the application may also be referred to as a system-level chip, a system chip, a chip system or a system-on-chip.

It should be understood that the processor in the embodiments of the disclosure may be an integrated circuit chip with signal processing capability. In the implementation process, the steps of the foregoing method embodiments can be completed by hardware integrated logic circuits in the processor or instructions in the form of software. The processor mentioned in some embodiments of the application may be a general-purpose processor, a digital signal processor (DSP), an application specific integrated circuit (ASIC), a field programmable gate array (FPGA), or other programming logic devices, discrete gate or transistor logic devices, discrete hardware components, which can achieve or implement the methods, steps and block diagrams disclosed in embodiments of the disclosure. The general-purpose processor may be a microprocessor or the processor may be any conventional processor or the like. The steps of the method disclosed in the embodiments of the disclosure may be directly embodied as being executed and completed by a hardware decoding processor, or executed and completed by a combination of hardware and software modules in the decoding processor. The software module can be located in a mature storage medium in the art, such as random access memory, flash memory, read-only memory, programmable read-only memory, or electrically erasable programmable memory, registers. The storage medium is located in the memory, and the processor reads the information in the memory and completes the steps of the above method in combination with its hardware.

The memory mentioned in some embodiments of the application may be a volatile memory or a non-volatile memory, or may include both volatile and non-volatile memory. In some embodiments, the non-volatile memory may be read-only memory (ROM), programmable read-only memory (PROM), erasable programmable read-only memory (erasable PROM, EPROM), electrical memory erasable programmable read-only memory (EPROM, EEPROM) or flash memory. The volatile memory may be a random access memory (RAM), which is used as an external cache. By way of exemplary but not restrictive illustration, many forms of RAM are available, for example, static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link dynamic random access memory (synch link DRAM, SLDRAM), and direct Rambus random access memory (direct Rambus RAM, DR RAM) and so on. It should be noted that the memories in the systems and methods described herein are intended to include, but are not limited to, these and any other suitable types of memories.

It should be understood that the foregoing memories are exemplary but not restrictive. For example, the memory in the embodiments of the disclosure may also be static random access memory (static RAM, SRAM), dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), and the like. In other words, the memory in the embodiments of the disclosure is intended to include, but is not limited to, these and any other suitable types of memory.

Figure 8:
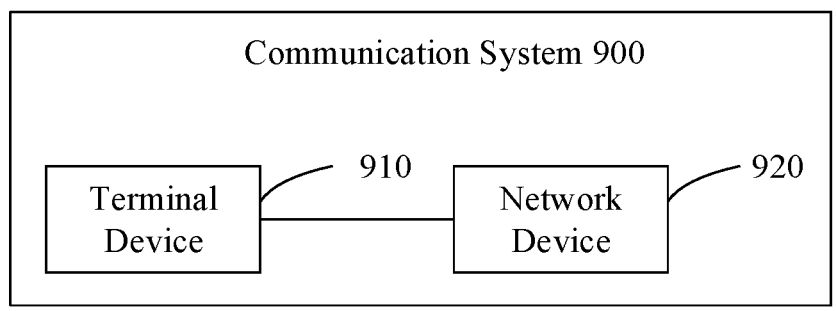
FIG. 8 is a schematic diagram illustrating a communication system architecture according to a second embodiment of the application.

FIG. 8 is a block diagram illustrating a communication system 1100 according to an embodiment of the application. As shown in FIG. 8, the communication system 1100 includes a terminal device 1110 and a network device 1120.

Herein, the terminal device 1110 may be configured to implement the corresponding functions implemented by the UE in the foregoing method, and the network device 1120 may be configured to implement the corresponding functions implemented by the network device in the foregoing method. For brevity, details are not described herein again.

Embodiments of the disclosure further provide a computer readable storage medium, which is configured to store a computer program.

Optionally, the computer readable storage medium may be applied to the network device or satellite in some embodiments of the application, and the computer program causes the computer to execute the corresponding process implemented by the network device in each method in some embodiments of the application. For the sake of brevity, details will not be repeated here.

A computer program product is also provided in some embodiments of the application, including computer program instructions.

Optionally, the computer program product can be applied to the network device or satellite in some embodiments of the application, and the computer program instruction causes the computer to execute a corresponding process implemented by the network device in each method in some embodiments of the application. For the sake of brevity, details will not be repeated here.

A computer program is also provided in some embodiments of the application.

Optionally, the computer program may be applied to the network device or satellite in some embodiments of the application. When the computer program is run on a computer, the computer is caused to execute a corresponding process implemented by the network device in each method in some embodiments of the application. For the sake of brevity, details will not be repeated here.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Those of ordinary skill in the art can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments as described above are only exemplary. For example, the division of the units is only a logical function division, and there may be other divisions in actual implementation. For example, multiple units or components can be combined or integrated into another system, or some features can be ignored or not carried out. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the disclosure may be integrated into one processing unit, or each unit may exist alone physically, or two or more units may be integrated into one unit.

If the functions are implemented in the form of software functional units and sold or used as an independent product, they can be stored in a computer-readable storage medium. Based on this understanding, an essential part of the technical solution of this application or, in other words, a part thereof that contributes to existing technology, or other parts of the technical solution can be embodied in the form of a software product. The computer software product is stored in a storage medium, including several instructions used for causing a computer device (which may be a personal computer, a server, or a network device, and the like) to perform all or part of the steps of the method described in some embodiments of the application. The foregoing storage medium includes various medium that can store program codes, such as a U disk, a mobile hard disk, a ROM, a RAM, a magnetic disk, or an optical disk.

The above content is only a specific implementation of the embodiments of the application, without limiting the protection scope of the embodiments of the application. Any modification or replacement conceived by those skilled in the art within the technical scope disclosed in some embodiments of the application should be covered within the protection scope of the embodiments of the application. Therefore, the protection scope of the embodiments of the application shall be subject to the protection scope of the claims.

What is claimed is:

1. A method for receiving a signal, comprising:
controlling, by a terminal device in active time of discontinuous reception (DRX), one or more carriers to process signal through a first processing manner, wherein, in the first processing manner, processing is stopped, within at least part of the active time, for at least part of the signal transmitted by the one or more carriers; and
during the active time when the first processing manner is adopted for a first carrier to process signal transmitted by the first carrier, receiving, through a second carrier, first indication information sent via a downlink control channel, wherein the first indication information is used for indicating to exit the first processing manner for the first carrier.

2. The method according to claim 1, wherein the first carrier comprises one or more secondary carriers configured and activated by the terminal device.

3. The method according to claim 2, wherein the first processing manner comprises at least one of following:
within the active time, stopping monitoring at least part of physical downlink control channel (PDCCH) search space;
within the active time, monitoring at least part of the PDCCH search space by using an adjusted monitoring period, wherein a length of the adjusted monitoring period is greater than an original monitoring period;
within the active time, setting a blind PDCCH detection number as an adjusted first value, wherein the adjusted first value is smaller than an original first value of the blind PDCCH detection number; or
within the active time, setting a channel estimation resource number as an adjusted second value, wherein the adjusted second value is smaller than an original second value of the channel estimation resource number.

4. The method according to claim 3, further comprising:
obtaining the adjusted monitoring period by adjusting the original monitoring period based on an adjustment factor; or,
determining a pre-configured monitoring period as the adjusted monitoring period.

5. The method according to claim 2, further comprising:
acquiring configuration information sent by a network device, wherein the configuration information is used for indicating whether to enable the terminal device to adopt the first processing manner.

6. The method according to claim 5, further comprising:
when the configuration information indicates that the terminal device is not enabled to adopt the first processing manner, controlling, by the terminal device during the active time of DRX, to process the signal transmitted by the one or more carriers through a second processing manner;
wherein, the second processing manner is different from the first processing manner, and in the second processing manner, the processing is maintained for the signal transmitted by the one or more carriers during the active time, and the maintained processing includes monitoring a configured control channel search space of the carrier.

7. The method according to claim 2, further comprising:
controlling, based on the first indication information, to exit the first processing manner for the first carrier, and processing, on the first carrier, the signal transmitted by the first carrier through a second processing manner;
wherein, the second processing manner is different from the first processing manner, and in the second processing manner, processing is maintained for the signal transmitted by the first carrier during the active time, and the maintained processing includes monitoring a configured control channel search space of the first carrier.

8. The method according to claim 7, further comprising:
during the active time when the second processing manner is adopted for the first carrier, receiving, through the first carrier, second indication information sent via the downlink control channel, wherein the second indication information is used for indicating to enter the first processing manner for the first carrier.

9. The method according to claim 1, wherein the first carrier comprises a secondary carrier and/or a primary carrier.

10. The method according to claim 1, further comprising:
determining, by the terminal device, whether to enter the active time of DRX according to an indication of energy saving signal and/or through a DRX timer.

11. A terminal device, comprising: a processor, a transceiver and a memory configured to store a computer program executable by the processor,
wherein the memory is configured to store the computer program, and the processor, through calling and running the computer program stored in the memory, is configured to control, in active time of discontinuous reception (DRX), one or more carriers to process signal through a first processing manner, wherein, in the first processing manner, processing is stopped, within at least part of the active time, for at least part of the signal transmitted by the one or more carriers; and
wherein the transceiver is configured to, during the active time when the first processing manner is adopted for a first carrier to process signal transmitted by the first carrier, receive, through a second carrier, first indication information sent via a downlink control channel, wherein the first indication information is used for indicating to exit the first processing manner for the first carrier.

12. The terminal device according to claim 11, wherein the first carrier comprises one or more secondary carriers configured and activated by the terminal device.

13. The terminal device according to claim 12, wherein the first processing manner comprises at least one of following:
within the active time, stopping monitoring at least part of physical downlink control channel (PDCCH) search space;
within the active time, monitoring at least part of the PDCCH search space by using an adjusted monitoring period, wherein a length of the adjusted monitoring period is greater than an original monitoring period;
within the active time, setting a blind PDCCH detection number as an adjusted first value, wherein the adjusted first value is smaller than an original first value of the blind PDCCH detection number; or
within the active time, setting a channel estimation resource number as an adjusted second value, wherein the adjusted second value is smaller than an original second value of the channel estimation resource number.

14. The terminal device according to claim 13, wherein the processor is further configured to obtain the adjusted monitoring period by adjusting the original monitoring period based on an adjustment factor; or
determine a pre-configured monitoring period as the adjusted monitoring period.

15. The terminal device according to claim 12, wherein the transceiver is further configured to acquire configuration information sent by a network device, wherein the configuration information is used for indicating whether to enable the terminal device to adopt the first processing manner.

16. The terminal device according to claim 15, wherein the processor is further configured to, in response to the configuration information that the terminal device is not enabled to adopt the first processing manner, process the signal transmitted by the one or more carriers through a second processing manner;

wherein, the second processing manner is different from the first processing manner, and in the second processing manner, the processing is maintained for the signal transmitted by the one or more carriers during the active time, and the maintained processing includes monitoring a configured control channel search space of the carrier.

17. The terminal device according to claim 12, wherein the processor is further configured to control, based on the first indication information, to exit the first processing manner for the first carrier, and process, on the first carrier, the signal transmitted by the first carrier through a second processing manner;

wherein, the second processing manner is different from the first processing manner, and in the second processing manner, processing is maintained for the signal transmitted by the first carrier during the active time, and the maintained processing includes monitoring a configured control channel search space of the first carrier.

18. The terminal device according to claim 17, wherein the transceiver is further configured to, during the active time when the second processing manner is adopted for the first carrier, receive, through the first carrier, second indication information sent via the downlink control channel, wherein the second indication information is used for indicating to enter the first processing manner for the first carrier.

19. The terminal device according to claim 11, wherein the first carrier comprises a secondary carrier and/or a primary carrier.

20. A non-transitory computer readable storage medium, being used for storing a computer program, wherein the computer program causes a computer to implement a method for receiving signal, the method comprising:

controlling, in active time of discontinuous reception (DRX), one or more carriers to process signal through a first processing manner, wherein, in the first processing manner, processing is stopped, within at least part of the active time, for at least part of the signal transmitted by the one or more carriers; and during the active time when the first processing manner is adopted for a first carrier to process signal transmitted by the first carrier, receiving, through a second carrier, first indication information sent via a downlink control channel, wherein the first indication information is used for indicating to exit the first processing manner for the first carrier.

\* \* \* \* \*